US006484836B2

(12) United States Patent
Tsuji

(10) Patent No.: US 6,484,836 B2
(45) Date of Patent: Nov. 26, 2002

(54) METER DISPLAY DEVICE FOR SADDLE TYPE VEHICLE

(75) Inventor: Mitsuru Tsuji, Shizuoka-ken (JP)

(73) Assignee: Kabushiki Kaisha Moric, Shizuoka-ken (JP)

( * ) Notice: Subject to any disclaimer, the term of this patent is extended or adjusted under 35 U.S.C. 154(b) by 0 days.

(21) Appl. No.: 09/681,660

(22) Filed: May 17, 2001

(65) Prior Publication Data

US 2001/0048402 A1 Dec. 6, 2001

(30) Foreign Application Priority Data

May 30, 2000 (JP) ....................................... 2000-161291

(51) Int. Cl.[7] ................................................ B62D 25/14
(52) U.S. Cl. ........................... 180/90; 296/73; 296/78.1
(58) Field of Search ................... 180/90, 219; 280/775; 296/192, 70, 73–77.1, 78.1

(56) References Cited

U.S. PATENT DOCUMENTS 4,019,774 A * 4/1977 Tsukahara et al. ......... 296/78.1
D276,715 S * 12/1984 Morioka et al. ........... D12/192
4,489,973 A * 12/1984 Willey ........................ 296/78.1
D279,976 S * 8/1985 Akira et al. ............... D12/192
4,687,072 A * 8/1987 Komuro ...................... 180/219
4,709,774 A * 12/1987 Saito et al. ................. 180/229
4,715,465 A * 12/1987 Takahashi et al. .......... 180/219
4,807,919 A * 2/1989 Ito ............................. 224/413
4,983,951 A * 1/1991 Igarashi et al. ............. 340/461
6,249,744 B1 * 6/2001 Morita ....................... 340/988

FOREIGN PATENT DOCUMENTS

JP 57-190218 * 11/1982

* cited by examiner

*Primary Examiner*—Peter C. English
*Assistant Examiner*—Toan C To
(74) *Attorney, Agent, or Firm*—Ernest A. Beutler

(57) ABSTRACT

An improved instrument display for a saddle type vehicle wherein the display is mounted in a recess in the handlebar cover in an adjustable manner to be effectively viewed by riders of widely varying stature. Two embodiments of adjustment mechanisms are disclosed.

20 Claims, 4 Drawing Sheets

METER DISPLAY DEVICE FOR SADDLE TYPE VEHICLE

BACKGROUND OF INVENTION

This invention relates a meter display for a saddle type vehicle and more particularly to an improved and adjustable meter display for such vehicles.

There is a very popular type of vehicle that is provided with a seat on which an operator may sit in a saddle type fashion with his feet disposed at a lower level. Normally this type of vehicle has two wheels and the front wheel is dirigible by means of a handlebar assembly carried at the upper end of the front wheel suspension system. It is desirable to provide a display in the vicinity of the handlebar mechanism for displaying information such as vehicle speed, engine speed or other conditions to the rider. However, there is a great difference in the size and stature of the persons that ride these type vehicles. When the display is of the liquid crystal type, the angle of incidence to the rider's eyes is very important. Hence, it is difficult to provide such a display that can be viewed by the multiple types of riders that ride this type of vehicle.

It is, therefore, a principal object to this invention to provide an improved adjustable display for the instruments of a vehicle of this type.

However, the display normally receives signals from one or more sensors placed at various positions on the vehicle. These sensors then transmit their signals through one or more wire harnesses to the display unit. It is important that the wire harnesses not be subject to considerable bending or flexure as may result from adjustment of the display. In addition, if the display is adjusted, it may expose parts of the display that will appear unsightly or alternatively could leave gaps in the viewing area that would be objectionable.

It is, therefore, a still further object to this invention to provide an improved compact and yet neat adjustable display for a vehicle of this type and wherein the display face may be adjusted without opening gaps that would expose components, which should be concealed.

SUMMARY OF INVENTION

This invention is adapted to be embodied in a vehicle having a seat upon which a rider is seated with his feet extending forwardly and downwardly. A handlebar assembly is provided at the front of vehicle for steering of the vehicle in its path of movement. A cover is associated with the handlebar and defines an internal recess in which a liquid crystal display is mounted for adjustment about an axis that extends transversely to the longitudinal center line of the vehicle so as to accommodate viewing by a variety of different size riders.

DETAILED DESCRIPTION

Figure 1:
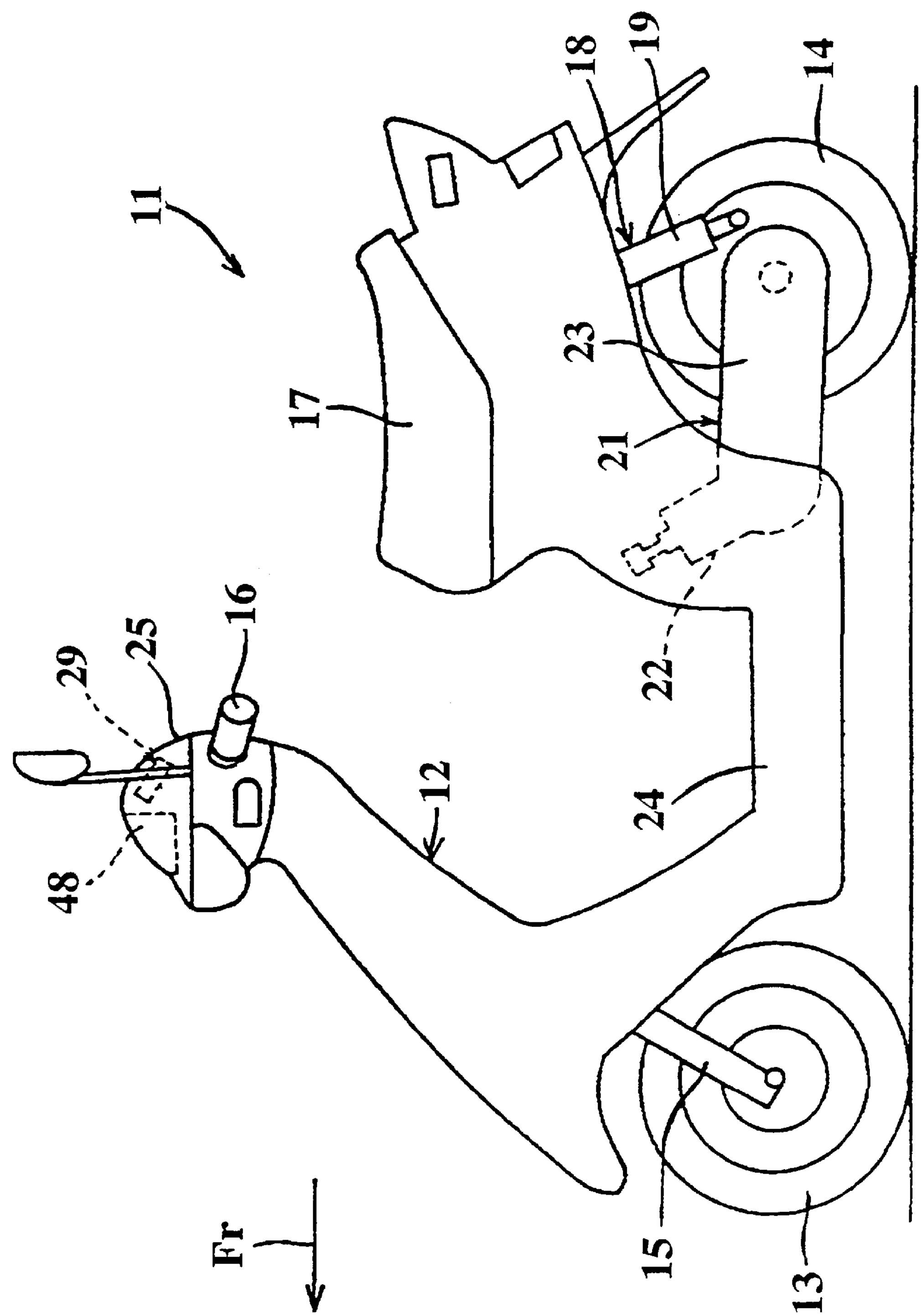
FIG. 1 is a side elevational view of a motor scooter constructed in accordance with an embodiment of the invention.

Referring first to FIG. 1, a motor scooter constructed in accordance with an embodiment of the invention is identified generally by the reference numeral 11. The motor scooter 11 includes a main body portion, indicated generally by the reference numeral 12, from which a front wheel 13 and rear wheel 14 are suspended. The front wheel 13 is dirigibly supported by the main body portion 12 in a known manner by means that includes a front fork 15 that is steered by a handlebar assembly 16.

The rear wheel 14 underlies a rider's seat 17 and is journalled by a suspension system, indicated generally by the reference numeral 18 and which includes a rear shock absorber 19. An engine transmission assembly , indicated generally by the reference numeral 21 consists of an internal combustion engine 22 and a transmission 23 that drives the rear wheel 14. This engine transmission assembly 21 is pivotally mounted on the main body portion 12 by the suspension system 18 in a suitable manner for accommodating the suspension movement of the rear wheel 14.

A foot area 24 is formed by the main body portion 12 forwardly of the seat 17 so that a rider seated on the seat may place his feet o n th e foot area 24.

Figure 2:
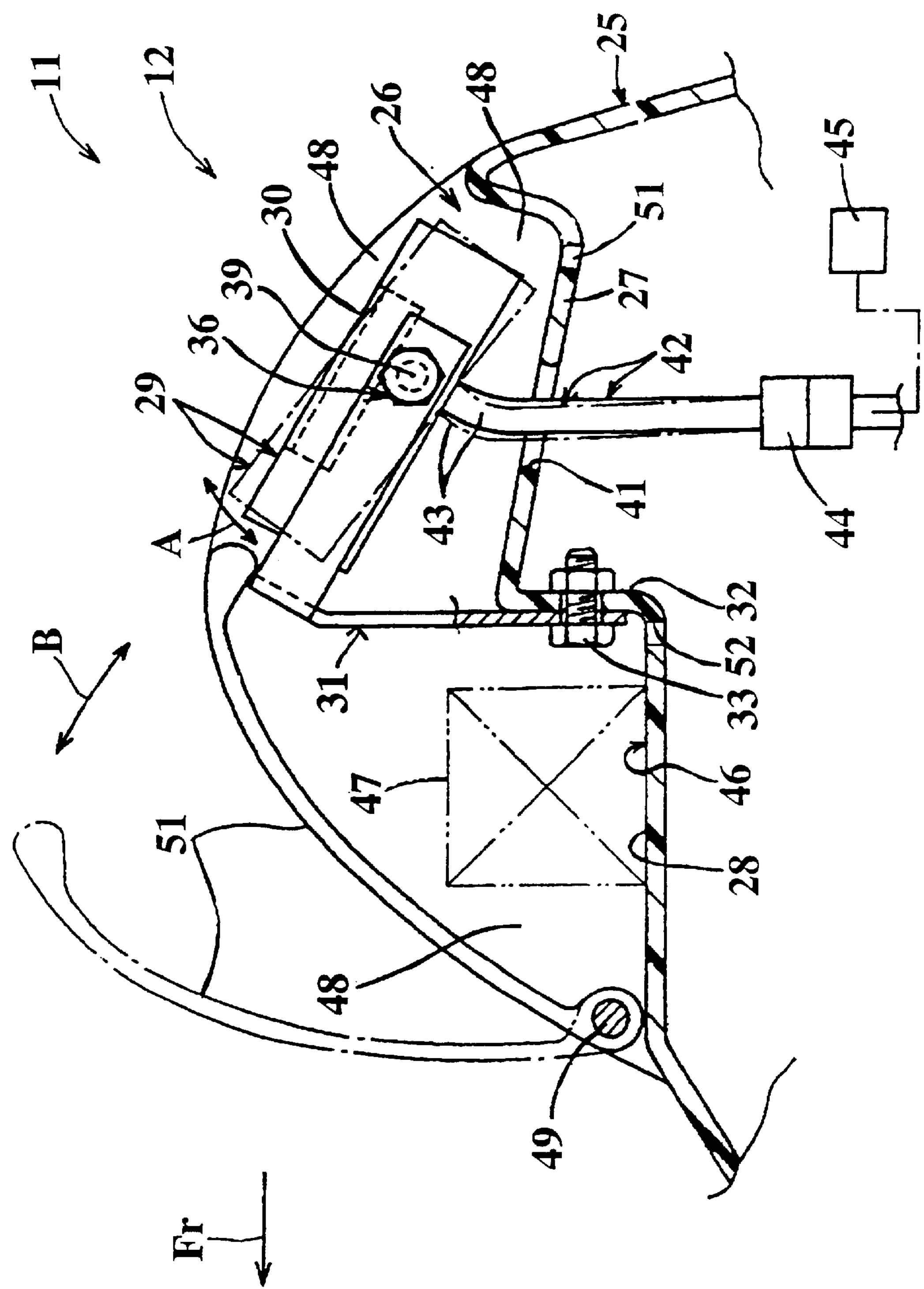
FIG. 2 is an enlarged cross sectional view taken through the handlebar cover of the motorcycle and shows the instrument mounting of the invention and certain of the components that are movable in one position in solid lines and in another position in phantom lines.
Figure 3:
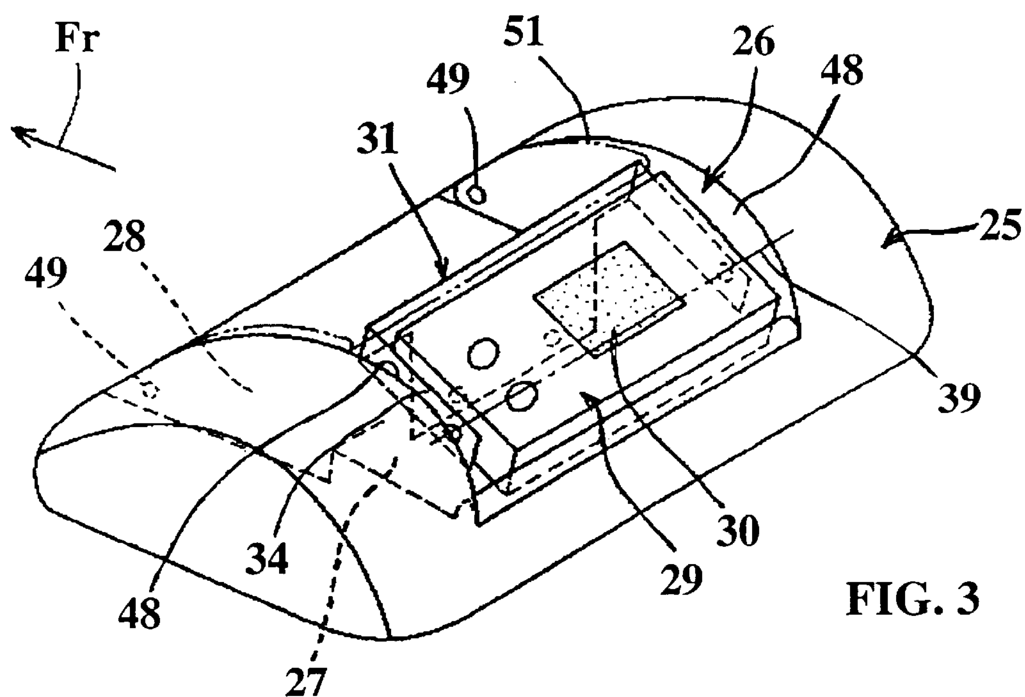
FIG. 3 is a perspective view from the rear and side of the structure shown in FIG. 2 and with the storage compartment cover shown in phantom.
Figure 4:
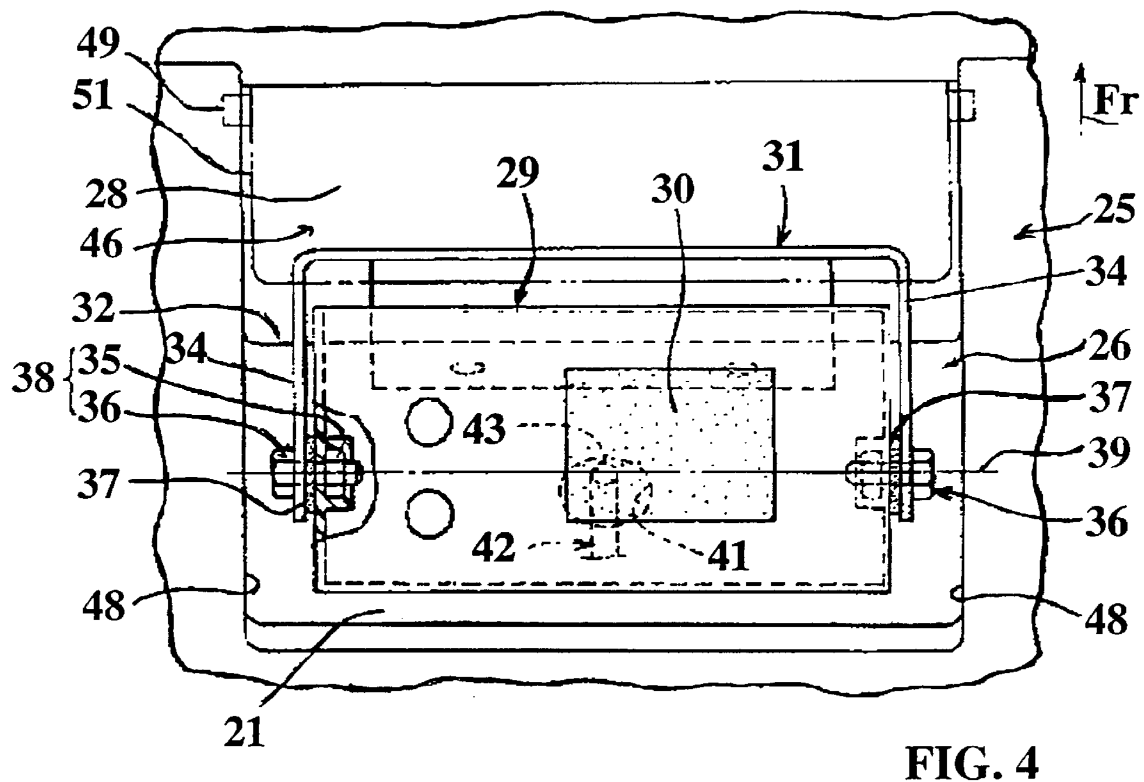
FIG. 4 is a top plan view of the structure shown in FIG. 3.

The handlebar assembly 16 is enclosed by a cover comprised of a main cover portion 25 and which is shown in perspective view in FIG. 3 and partially in top plan view in FIG. 4. FIG. 2 is a cross sectional view through this assembly.

Referring now primarily to these figures (FIGS. 2–4), it will be seen that the main cover portion 25 has a generally cylindrical shape with rounded end portions. A recessed area, indicated by the reference numeral 26 is formed in the upper central portion of this main cover portion 25 which is formed in part by a recessed or indented upper wall portion 27 that extends generally transversely across a substantial portion of the width of the main cover portion 25 and a second, forward lower wall portion 28 of the main cover 25.

The recessed area 26 and specifically the part thereof formed by the upper wall portion 27 receives a display assembly 29 which includes, among other things, a liquid crystal display 30. This display assembly 29 is carried by a bracket member 31 which has its lower portion affixed to a vertically extending wall part 32 formed where the wall portions 27 and 28 are joined. A threaded fastener 33 holds this support bracket member 31 in position.

As best seen in FIG. 4, the bracket member 31 has a pair of leg portions 34 that extend rearwardly into the portion of the recessed area 26 formed by the upper wall portion 27. A pair of female threaded fasteners 35 are imbedded in the case of the display assembly 29. Apertures in the leg portions 34 pass male threaded fasteners 36 with a rubber frictional washer 37 being interposed between the each of the bracket leg portions 34 and the sides of the case of the display assembly 29.

This fastener assembly, indicated generally by the reference numeral 38 functions to provide a pivot axis 39 about which the display assembly 29 and specifically the liquid crystal display 30 may be viewed. Thus, the rider may adjust this display to his viewing preference merely by applying pressure on the upper surface of the display assembly 29.

It should be noted that the pivot axis 39 overlies an enlarged opening 41 formed in the upper wall portion 27 through which a wire harness 42 may be passed. This wire harness 42 has leads 43 that enter into the display assembly 29 in line with the pivot axis 39 so as to minimize the amount of bending of the leads 43 when the display is adjusted through its range of movement, indicated by the arrow A in FIG. 2.

A quick disconnect coupling 44 connects the wire harness 42 to one or more sensors, shown schematically at 45, that are mounted on the vehicle and sense conditions such as vehicle speed, engine speed or the like which are displayed on the liquid crystal display 30.

The forward part of the recessed area 26 formed in part by the lower wall portion 28 functions to provide a storage area, indicated generally by the reference numeral 46 in which small articles may be positioned one of which is shown in phantom in FIG. 2 and is identified by the reference numeral 47. Upstanding walls 48 at opposite ends of the lower wall portion 28 carry pivot pins 49 on which a pivoted closure member 51 is supported.

In its closed position, as shown in the solid line view of FIG. 2, this closure member 51 covers the rear portion of the cavity in which the display assembly 29 is mounted so as to provide a neat appearance. In its opened position, when pivoted in the direction of the arrow B, the closure member 51 permits ease of access to the contents for insertion or removal.

Drain holes 52 and 53 are formed at lower portions of the upper wall portion 27 and lower wall 28 of the recessed area 26. These holes 52 and 53 will allow any accumulated water to drain from these areas.

Figure 5:
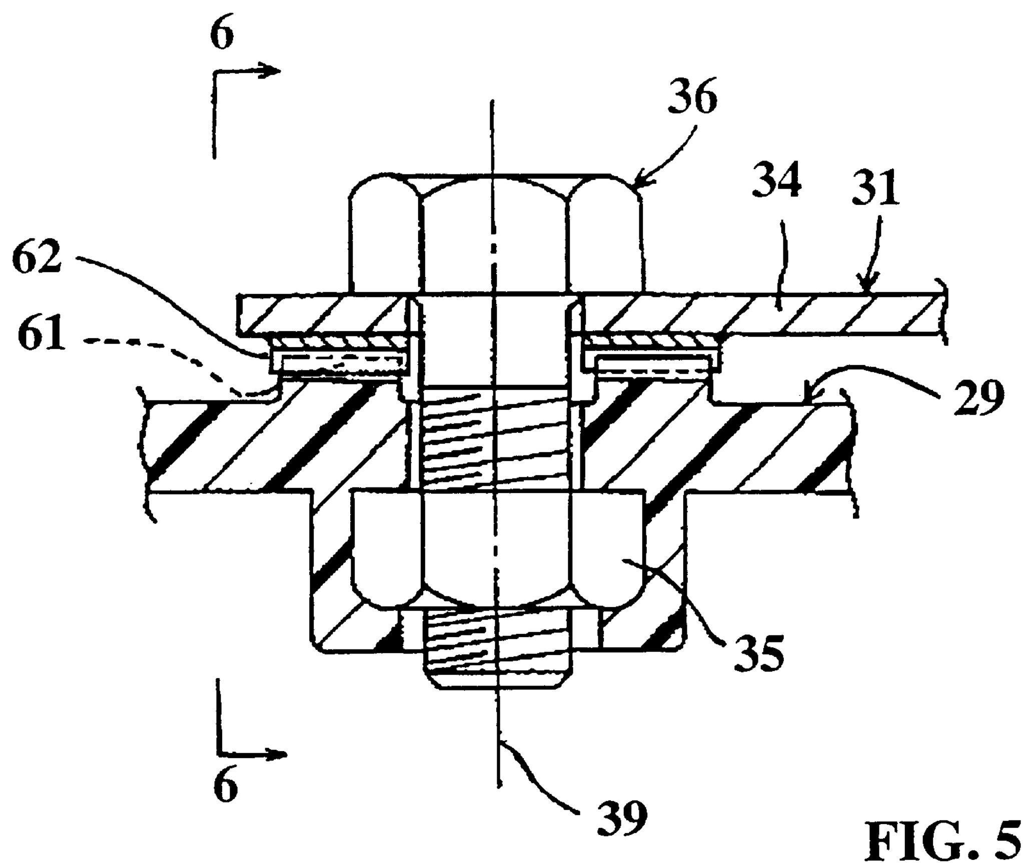
FIG. 5 is a partial cross sectional view taken along the same plan as that shown in FIG. 4 but illustrating a different embodiment of the invention for permitting the adjustment.
Figure 6:
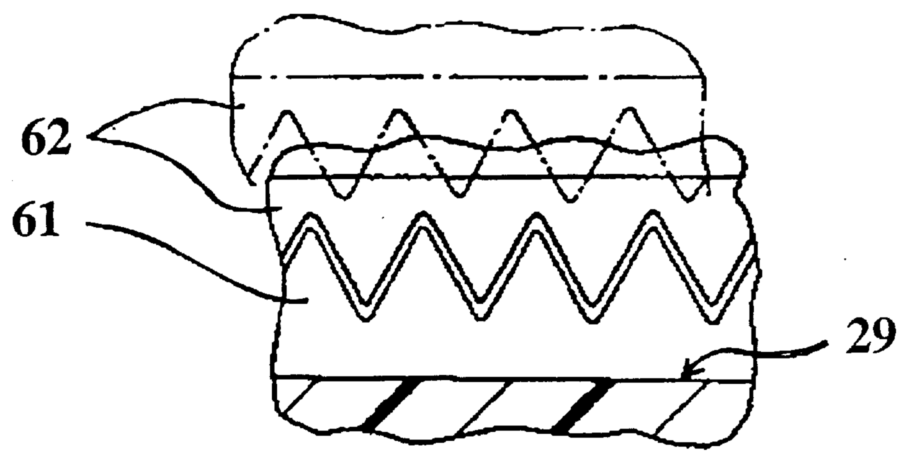
FIG. 6 is a cross sectional view looking along the line 6—6 of FIG. 5.

In this embodiment, the elastic frictional washers 37 provide anti-rattle mounting for the display assembly 29 while holding it in its adjusted position. FIGS. 5 and 6 show another embodiment wherein a more positive locking is achieved.

This achieved by forming the case of the display assembly 29 with a plurality of serrations 61 which cooperate with serrations 62 formed on the leg portions 34 of the mounting bracket member 31. By tightening or loosening the threaded fasteners 36 in its engagement with the embedded nut 35, it is possible to open the gap between these serrations or teeth as shown in the phantom line view in FIG. 6 and permit adjustment to be made. When the fasteners 36 are again tightened into the nuts 35, the display assembly 29 will be locked into its adjusted position.

Thus, from the foregoing description it should be readily apparent that the described construction permits a very neat appearing display as well as one that can be easily adjusted to permit convenient viewing by a wide variety of riders. In addition, the electrical wiring is connected to the display in such a way that it will undergo minimum flexure during adjustment. Of course, the foregoing description is that of a preferred embodiment of the invention and various changes and modifications may be made without departing from the spirit and scope of the invention, as defined by the appended claims.

What is claimed is:

1. A vehicle having a seat upon which a rider is to be seated with his feet extending forwardly and downwardly, a handlebar assembly at the front of said seat and said vehicle for steering of said vehicle in its path of movement, a cover associated with said handlebar and defining an internal recess surrounded by a generally upwardly facing opening in which a liquid crystal display is mounted with a display face viewable through said generally upwardly facing opening, said mounting of said display providing for pivotal adjustment of a display face about an axis extending transversely to a longitudinal center line of said vehicle so as to accommodate viewing by a variety of different size riders.

2. A vehicle as set forth in claim 1 wherein the pivotal adjustment is provided by a pair of spaced threaded fasteners.

3. A vehicle as set forth in claim 2 wherein the threaded fasteners cooperate with the liquid crystal display through a structure for retaining the display face in an adjusted position.

4. A vehicle as set forth in claim 3 wherein the structure for retaining the display face in an adjusted position includes a pair of resilient washers for damping vibrations and frictional resistance t o pivotal movement.

5. A vehicle as set forth in claim 3 wherein the structure for retaining the display face in an adjusted position includes interengaging serrated members for preventing pivotal movement when engaged.

6. A vehicle as set forth in claim 1 wherein the cover internal recess is defined by a wall having an opening below said generally upwardly facing opening and through which a lead is passed for conveying signals between a remotely positioned sensor and the liquid crystal display.

7. A vehicle as set forth in claim 1 wherein the cover internal recess is elongated in at least one direction from the liquid crystal display to provide a compartment for other objects.

8. A vehicle as set forth in claim 7 wherein the elongated portion of the recess is closed by a removable cover.

9. A vehicle as set forth in claim 8 wherein the removable cover has an edge portion that is juxtaposed to the liquid crystal display when said removable cover is closed.

10. A vehicle as set forth in claim 9 wherein the removable cover is pivotal about an axis spaced from the liquid crystal display.

11. A vehicle having a seat upon which a rider is to be seated with his feet extending forwardly and downwardly, a handlebar assembly at the front of said seat and said vehicle for steering of said vehicle in its path of movement, a cover associated with said handlebar and defining an internal recess in which a liquid crystal display is mounted, said internal recess being defined by a wall having an opening through which a lead is passed for conveying signals between a remotely positioned sensor and said liquid crystal display, said mounting of said display providing for pivotal adjustment of a display face about an axis extending transversely to a longitudinal center line of said vehicle so as to accommodate viewing by a variety of different size riders, said wall opening being aligned with said axis for minimizing deflection of said lead upon adjustment of said liquid crystal display.

12. A vehicle as set forth in claim 11 wherein the wall in which the opening is formed is the lower wall of the cover.

13. A vehicle as set forth in claim 12 wherein the cover internal recess is elongated in at least one direction from the liquid crystal display to provide a compartment for other objects.

14. A vehicle as set forth in claim 13 wherein the elongated portion of the recess is closed by a removable cover.

15. A vehicle as set forth in claim 14 wherein the removable cover has an edge portion that is juxtaposed to the liquid crystal display when said removable cover is closed.

16. A vehicle as set forth in claim 15 wherein the removable cover is pivotal about an axis spaced from the liquid crystal display.

17. A vehicle as set forth in claim 16 wherein the pivotal adjustment is provided by a pair of spaced threaded fasteners.

18. A vehicle as set forth in claim 17 wherein the threaded fasteners cooperate with the liquid crystal display through a structure for retaining the display face in an adjusted position.

19. A vehicle as set forth in claim 18 wherein the structure for retaining the display face in an adjusted position includes a pair of resilient washers for damping vibrations and frictional resistance to pivotal movement.

20. A vehicle as set forth in claim 18 wherein the structure for retaining the display face in an adjusted position includes interengaging serrated members for preventing pivotal movement when engaged.

* * * * *